C. F. ZIMMERMAN.
SHEARS.
APPLICATION FILED JAN. 25, 1912.
1,082,385.
Patented Dec. 23, 1913.
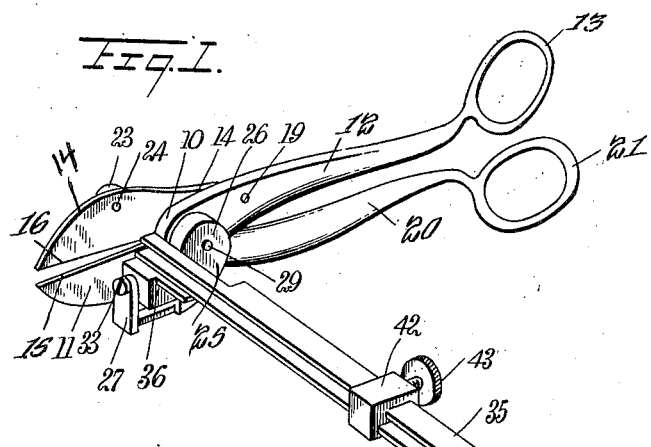
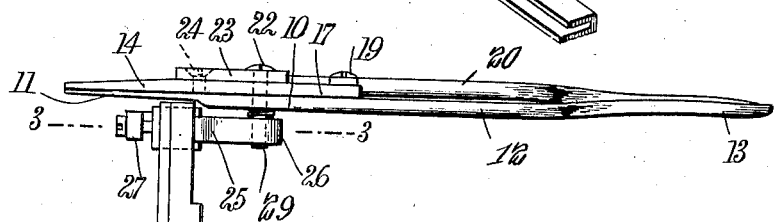
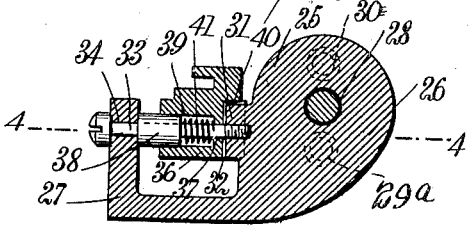
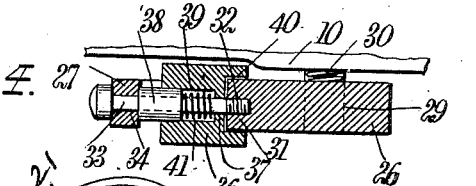
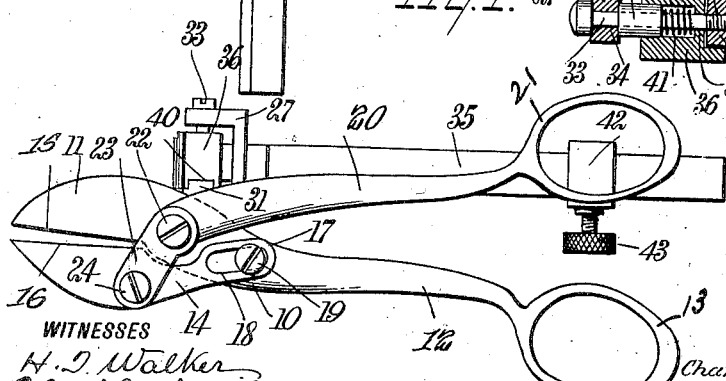
WITNESSES
H. J. Walker
John K. Bradley
INVENTOR
Charles F. Zimmerman
BY
ATTORNEYS

UNITED STATES PATENT OFFICE.

CHARLES F. ZIMMERMAN, OF JERSEY CITY, NEW JERSEY.

SHEARS.

1,082,385.  Specification of Letters Patent.  Patented Dec. 23, 1913.

Application filed January 25, 1912. Serial No. 673,289.

*To all whom it may concern:*

Be it known that I, CHARLES F. ZIMMERMAN, a citizen of the United States, and a resident of Jersey City, in the county of Hudson and State of New Jersey, have invented a new and Improved Shears, of which the following is a full, clear, and exact description.

This invention relates to shears for cutting sheet metal or for other like purposes, and has reference more particularly to shears comprising a member consisting of a blade and a handle, a second blade pivotally mounted on said member, and a second handle pivotally mounted upon said member and having an extension pivotally connected with said second blade.

The invention also has reference to the combination of shears and a gage foldably associated therewith and having means for locking the gage in an operative position, the gage serving adjustably to determine the length of material to be severed.

An object of the invention is to provide simple and efficient shears which can be easily manipulated, by means of which powerful leverage can be applied to the blades or jaws to effect the cutting action, in which the blades have a relative sliding movement to effect a true shearing cut, which comprise comparatively few parts, which are light in weight and compact in form, and in which one of the blades is removable and can be replaced when necessary or desirable.

A further object of the invention is to provide in combination with a pair of shears, an adjustable gage for determining the lengths of material to be severed by the shears, the gage being simple and effective and being foldably arranged so that it can be disposed adjacent to and substantially parallel with the shears when not in use, which permits the shears to be used without the gage when necessary, and in which a lock is provided for securing the gage in an operative position with respect to the shears.

The invention consists in the construction and combination of parts to be more fully described hereinafter and particularly set forth in the claims.

Reference is to be had to the accompanying drawings, forming a part of this specification, in which similar characters of reference indicate corresponding parts and in which—

Figure 1 is a perspective view of an embodiment of my invention; Fig. 2 is a plan view of the device; Fig. 3 is an enlarged, transverse section on the line 3—3 of Fig. 2; Fig. 4 is a similar section on the line 4—4 of Fig. 3; and Fig. 5 is a side elevation of the shears showing the gage folded back into an inoperative position.

Before proceeding to a more detailed explanation of my invention, it should be clearly understood that the shears themselves, aside from the gage associated therewith, can be applied to a variety of purposes. In the form of the device illustrated for example, herewith, I have shown a pair of gage shears intended primarily for use by printers in cutting leads. The gage permits the desired length of lead to be determined with accuracy. However, the shears themselves, as will be readily seen, can be employed for example, by tinsmiths or others, in cutting sheet metal, and for different, similar purposes.

Certain of the details of construction, shown for example herewith, form no part of the invention, and can be varied in accordance with individual preference and special conditions, without deviating from the spirit of the invention as defined in the appended claims.

Referring more particularly to the drawings, I have shown a pair of shears including a member 10, fashioned from tool steel or other suitable material, and having one end flattened and suitably sharpened to form a blade 11. The member 10 includes a length 12 constituting in effect a handle, and preferably provided with a finger loop 13 of conventional form. Slidably and pivotally mounted upon the member 10 is a second blade 14, substantially similar in shape to the blade 11. The cutting edges 15 and 16 of the blades are oppositely disposed and adapted to coöperate in the usual manner. The blade 14 has an extension 17 provided with a slot 18 receiving a screw 19 mounted upon the member 10. By means of the screw and the slot the blade 14 is slidably and pivotally connected with the member 10. A handle 20 having a finger loop 21 is pivotally mounted by means of a pivotal screw 22 upon the member 10. The screws 19 and 22 are spaced a suitable distance apart, as is clearly shown in Fig. 5. The member 20 has an extension 23 angularly disposed relative to the length of the handle 20 and pivotally connected by means of a screw 24, with the blade 14.

When the handles 12 and 20 are moved relatively to each other in the customary manner, the blades are likewise operated, and the cutting edges pass each other to effect the shearing cut. The blades have a relative, sliding movement as the extension 23 of the handle 20 tends to move the blade in the direction of its length, in addition to giving it a pivotal movement about its fulcrum screw 19. In this way a true shearing action of the blades is effected, which, as will be readily understood, augments the efficiency of operation of the shears. The gage, which is associated with the shears is connected therewith by means of a bracket 25 consisting of a rounded head 26 having a laterally disposed, offset arm 27. The bracket is pivotally mounted upon the shears by means of a central, threaded opening 28 which receives the corresponding, threaded and projecting end 29 of the screw 22. The head 26 has a pair of recesses 29ª in which are located helical springs 30 bearing against the member 10 and tending to hold the gage frictionally in position. Opposite the offset end of the arm 27 the bracket has an extension 31 in the form of a parallelepiped having a threaded recess 32 which receives a screw 33. The latter extends through an opening 34 near the end of the arm 27. A gage bar 35, preferably of channel form, has at the end a block 36, which is received between the extension 31 and the end of the arm 27, and is provided with an opening 37 through which the screw 33 passes, so that the gage bar is pivotally associated with the bracket. The screw 33 has an enlargement or collar 38 slidably received in a correspondingly formed recess 39 of the block 36. The latter has an opening 40 in the form of a parallelepiped which is adapted to receive therein the extension 31 in its different positions. A helical spring 41 is arranged upon the screw 33, engaging the enlargement 38 and the inner end of the recess 39. The spring tends to hold the bar in position such that the extension 31 is received in the opening 40. When the parts are so arranged, the gage bar is disposed at substantially right angles to the length of the shears in an operative position thereto. To release the gage bar it is necessary to move the bar transversely of its length, i. e., in the direction of the length of the screw 33, to disengage the bar and the extension 31. The bar can then be pivotally swung about the screw 33 and the bracket can subsequently be turned about the screw 22 to swing the bar into the position shown in Fig. 5.

A gage block 42 is slidably mounted upon the channel-shaped bar and is provided with an opening adapted for this purpose. It has a set-screw 43, by means of which it can be secured in different positions along the length of the bar. When the gage is to be used, the bar is arranged in an operative position, with the channel adjacent to the cutting edge of the blade 11. The gage block is adjusted as necessary or desirable, and the leads or other objects to be cut are then placed in the channel, with their rear ends abutting against the block. The blades are then operated in the usual manner, to cut off the part of the lead projecting between them.

Having thus described my invention, I claim as new, and desire to secure by Letters Patent:

1. In combination, shears and a gage foldably associated therewith and having means for automatically locking said gage in an operative position.

2. In combination, shears, a gage bar, a bracket for foldably connecting said gage bar and said shears, and means for automatically locking the gage bar in an operative position relative to said shears when the bracket is in a predetermined position.

3. In combination, a cutting device, a gage bar, means for mounting said bar upon said cutting device, whereby said bar is capable of a plurality of movements, means whereby said bar can be locked relative to said device, and whereby one of the movements of said bar serves to release the same from its locked position.

4. In combination, a cutting device, a bracket pivotally associated therewith, a gage bar pivotally and slidably mounted upon said bracket, and means for locking said bar in position with respect to said bracket, and whereby a sliding movement of said bar serves to release it from its locked position.

5. In combination, shears, a bracket pivotally associated with said shears, a gage bar having a pivotal and laterally movable connection with said bracket, said bracket having a part engaging said bar in a predetermined position thereof to lock said bar against pivotal movement, and a gage block adjustably mounted upon said bar.

6. In combination, shears, a bracket pivotally associated with said shears, a gage bar having a pivotal and laterally movable connection with said bracket, said bracket having a part engaging said bar in a predetermined position thereof to lock said bar against pivotal movement, a spring tending to hold said bar in a locked position, and a gage block adjustably mounted upon said bar.

7. In combination, shears, a bracket pivotally connected with said shears and having an offset arm, a pivot screw extending from said arm to said bracket, a gage bar having a block pivotally and slidably mounted upon said screw and having a recess, said bracket having an extension adapted to engage in said recess to lock said bar against pivotal movement, a spring tending to hold said bar in position such that said extension is received in said recess, said bar being of channel shape, and a gage block slidably mounted upon said bar and having means for securing it in any one of a plurality of different positions.

8. In combination, a cutting device, a bracket movably connected with said device and having an offset arm, a pivot member extending from said arm to said bracket, a gage bar having a block pivotally and slidably mounted upon said member, said bracket having a part adapted to engage said block to lock the same against pivotal movement, and a spring tending to hold said bar in a position such that said part is operative to lock said block against movement.

In testimony whereof I have signed my name to this specification in the presence of two subscribing witnesses.

CHARLES F. ZIMMERMAN.

Witnesses:
JOHN K. BRACHVOGEL,
PHILIP D. ROLLHAUS.